United States Patent
Hara

(10) Patent No.: US 9,944,119 B2
(45) Date of Patent: Apr. 17, 2018

(54) HUB ASSEMBLY FOR A BICYCLE

(71) Applicant: Shimano Inc., Sakai-shi, Osaka (JP)

(72) Inventor: Nobukatsu Hara, Sakai (JP)

(73) Assignee: Shimano Inc., Sakai-shi, Osaka (JP)

( * ) Notice: Subject to any disclaimer, the term of this patent is extended or adjusted under 35 U.S.C. 154(b) by 154 days.

(21) Appl. No.: 14/697,416

(22) Filed: Apr. 27, 2015

(65) Prior Publication Data

US 2016/0311256 A1 Oct. 27, 2016

(51) Int. Cl.
  *B60B 27/02* (2006.01)
  *B60B 27/04* (2006.01)
  *B60B 27/00* (2006.01)

(52) U.S. Cl.
  CPC ............ *B60B 27/023* (2013.01); *B60B 27/04* (2013.01); *B60B 27/0015* (2013.01)

(58) Field of Classification Search
  CPC .... B60B 27/023; B60B 27/04; B60B 27/0015
  USPC ............................................ 301/124.2, 110.5
  See application file for complete search history.

(56) References Cited

U.S. PATENT DOCUMENTS

| | | | |
|---|---|---|---|
| 6,736,464 B1 | 5/2004 | Pidoux | |
| 7,909,412 B2 * | 3/2011 | Ashman | B62K 25/02 |
| | | | 301/110.5 |
| 7,926,886 B1 * | 4/2011 | Ashman | B62K 25/02 |
| | | | 301/110.5 |
| 2006/0158022 A1 * | 7/2006 | Nicolai | B60B 27/0005 |
| | | | 301/110.5 |
| 2012/0322598 A1 * | 12/2012 | Lin | B62M 9/10 |
| | | | 474/160 |
| 2015/0015125 A1 | 1/2015 | Webber | |
| 2016/0039491 A1 | 2/2016 | Morelli | |

FOREIGN PATENT DOCUMENTS

| | | |
|---|---|---|
| DE | 3622639 A1 | 1/1988 |
| DE | 60002046 T2 | 2/2004 |
| DE | 102004063505 A1 | 7/2006 |
| GB | 640923 | 8/1950 |

* cited by examiner

*Primary Examiner* — S. Joseph Morano
*Assistant Examiner* — Jean Charleston
(74) *Attorney, Agent, or Firm* — Alleman Hall Creasman & Tuttle LLP

(57) ABSTRACT

A hub assembly for bicycle is provided. The hub assembly includes a hub shell having first and second ends at a distance from each other along a rotational axis, a first engagement structure pair having a first inner engagement structure and a first outer engagement structure, the first engagement structure pair being releasably engagable for co-rotation; and a second engagement structure pair having a second inner engagement structure and a second outer engagement structure, the pair being second engagement structure releasably engagable for co-rotation. The first inner engagement structure and the second outer engagement structure are configured not to engage with each other, and/or the second inner engagement structure and the first outer engagement structure are configured not to engage with each other.

19 Claims, 7 Drawing Sheets

HUB ASSEMBLY FOR A BICYCLE

BACKGROUND

It may be desirable to remove a hub assembly and therefore a wheel from a bicycle to repair desired bicycle components, decrease bicycle profile for transportation/storage, etc. For instance, a rider may remove a wheel from a bicycle to facilitate flat tire repair. However, previous hub assemblies may be fixedly attached to disk brake rotors and/or sprockets. Therefore, there is a need to more easily and/or quickly remove a wheel from the bicycle and reattach the wheel to the bicycle.

SUMMARY

According to a first aspect of the invention, the hub assembly may include a hub shell having first and second ends at a distance from each other along a rotational axis, a first engagement structure pair having a first inner engagement structure and a first outer engagement structure, the first engagement structure pair being releasably engagable for co-rotation, and a second engagement structure pair having a second inner engagement structure and a second outer engagement structure, the pair being second engagement structure releasably engagable for co-rotation, wherein the first inner engagement structure and the second outer engagement structure are configured not to engage with each other, and/or the second inner engagement structure and the first outer engagement structure are configured not to engage with each other. One potential advantage of a hub assembly with this configuration is that it may be easily attached, removed, and/or reattached to/from another portion of the hub assembly which may be attached to a bicycle frame or fork. Consequently, wheel repair efficiency can be increased. Another potential advantage of such a hub assembly configuration is that the likelihood of a rider improperly attaching or reattaching the portion of hub assembly to the other portion of the hub assembly is substantially reduced (e.g., avoided).

In the first aspect, the first inner engagement structure and the second outer engagement structure may have non-mating shapes that do not engage, and/or the second inner engagement structure and the first outer engagement structure may have non-mating shapes that do not engage with each other. One potential advantage of having the first and second engagement structures being non-mating shapes reduces the likelihood of a rider improperly attaching or reattaching a portion of the hub assembly to another portion of the hub assembly. As a result, the likelihood of damage caused by improper hub assembly installation is reduced. Another potential advantage of this hub assembly configuration is that a rider can easily identify the proper orientation of the hub assembly during attachment, removal, and/or reattachment of the portion of the hub assembly.

In the first aspect, the releasable engagement of the each of the first engagement structure pair and the second engagement structure pair may be accomplished by mating of an associated protrusion and a corresponding recess having a complementary shape to the protrusion. One potential advantage of this configuration is that the engagement structure pairs can be easily engaged, thereby decreasing the likelihood of significant wear on the protrusion surfaces during engagement/disengagement.

In the first aspect, the protrusion of the first engagement structure pair may be formed on the first inner engagement structure and the recess of the first engagement structure pair is formed on the first outer engagement structure. One potential advantage of this configuration is that the inner and outer engagement structures can have different geometric characteristics, enabling each of the engagement structures in the first engagement structure pair to have a desired structure and profile, for instance.

In the first aspect, the protrusion of the first engagement structure pair may be formed on the first outer engagement structure and the recess of the first engagement structure pair may be formed on the first inner engagement structure. One potential advantage of this configuration is that the inner and outer engagement structures can have different geometric characteristics, which enables the structural characteristics, compactness, etc., of the engagement structures to be tailored to a bicycle's design, if desired.

In the first aspect, the protrusion of the second engagement structure pair may be formed on the second inner engagement structure and the recess of the second engagement structure pair may be formed on the second outer engagement structure. One potential advantage of this configuration is again that the structural characteristics of each of the engagements structures in the second engagements structure pair can be tailored to best suit the bicycle's design, for example.

In the first aspect, the protrusion of the second engagement structure pair may be formed on the second outer engagement structure and the recess of the second engagement structure pair may be formed on the second inner engagement structure. One potential advantage of this configuration is again that the inner and outer engagement structures of the second engagement structure pair can have desired structural characteristics, enabling each of the engagement structures in the second engagement structure pair to have selected properties which can suit the bicycle's design.

In the first aspect, a shape characteristic of the protrusion of the first engagement structure pair and a shape characteristic of the recess of the second engagement structure pair may be different, and/or a shape characteristic of the protrusion of the second engagement structure pair and a shape characteristic of the recess of the first engagement structure pair may be different. One potential advantage of such a configuration is that the likelihood of improper attachment/reattachment of a portion of the hub assembly to another portion of the hub assembly is reduced and the desired engagement configuration of the structures in the hub assembly can be easily identified via the rider during attachment/reattachment of the portion of the hub assembly.

In the first aspect, the shape characteristic may be selected from the group consisting of an outer perimeter profile, a depth profile, a size, and a pitch. One potential advantage of selecting the shape characteristics from the aforementioned group is that the shape characteristics can be selected for desired mating characteristics, strength, wear characteristics, profiles, etc. As a result, the shape characteristics can be tailored to the bicycles design, if desired.

In the first aspect, the protrusion is one of a plurality of protrusions and the recess is one of a plurality of recesses, and wherein the releasable engagement of the each of the first engagement structure pair and the second engagement structure pair may be accomplished by mating of the plurality of protrusions and the plurality of recesses. One potential advantage of this configuration is that the engagement structure pairs can be easily engaged. Another advantage of the configuration is a decreased likelihood of significant wear of protrusion surfaces during engagement/ disengagement of a portion of the hub assembly with another portion of the hub assembly.

In the first aspect, the first inner engagement structure of the first engagement structure pair and/or the second inner engagement structure of the second engagement structure pair may include at least one of the recesses and at least one of the protrusions, and the first outer engagement structure of the first engagement structure pair and/or the second outer engagement structure of the second engagement structure pair may include at least one of the recesses and at least one of the protrusions. One potential advantage of this configuration is that the engagement structure pairs can be easily engaged. Another advantage of this configuration is a decreased likelihood of significant wear of protrusion surfaces during engagement/disengagement of a portion of the hub assembly with another portion of the hub assembly.

In the first aspect, the plurality of recesses and the plurality of protrusions may be incorporated in teeth formed on the first inner engagement structure and first outer engagement structure and/or the second inner engagement structure and second outer engagement structure. One potential advantage of such a configuration is that the strength of engagement between the engagement structures can be increased, decreasing the likelihood of unwanted disengagement.

In the first aspect, a pitch of the teeth of the first inner engagement structure and a pitch of the teeth of the second outer engagement structure may be different and/or a pitch of the teeth of the second inner engagement structure and a pitch of the teeth of the first outer engagement structure may be different. One potential advantage of such a configuration is that the likelihood of improper engagement between the engagement structures is reduced.

In the first aspect, the first inner engagement structure and the second outer engagement structure may differ in size so as to not engage with each other, and/or the second inner engagement structure and the first outer engagement structure may differ in size so as to not engage with each other. Again, one potential advantage of such a configuration is that the likelihood of improper engagement between the engagement structures is reduced.

In the first aspect, the first engagement structure pair and the second engagement structure pair may include identifying indicia indicating each pair. One potential advantage of such a configuration is that a rider can easily identify the proper configuration for engagement structures during attachment/reattachment of a portion of the hub assembly to another portion of the hub assembly, thereby decreasing the likelihood of improper engagement of the engagement structures.

In the first aspect, the indicia may be selected from a group consisting of pattern, color, picture, and text. One potential advantage of such a configuration is that the indicia can be selected such that a rider can easily identify the desired engagement configuration of the engagement structures.

In the first aspect, the indicia may be included on the first inner engagement structure and the first outer engagement structure and/or the second inner engagement structure and the second outer engagement structure. One potential advantage of such a configuration is that both engagement structure pairs can include indicia, enabling even easier identification of the proper engagement configuration of the engagement structures.

According to a second aspect of the invention a hub assembly for a bicycle may be provided that includes a hub shell having first and second ends at a distance from each other along a rotational axis, a first engagement structure pair having a first inner engagement structure and a first outer engagement structure, the first engagement structure pair being releasably engagable for co-rotation, and a second engagement structure pair having a second inner engagement structure and a second outer engagement structure, the pair being second engagement structure releasably engagable for co-rotation, wherein the first engagement structure pair and the second engagement structure pair include identifying indicia indicating each pair. One potential advantage of such a configuration is that a portion of the hub assembly can be easily removed from another portion of the hub assembly and during reassembly the proper engagement configuration of the engagement structures can be easily identified via the indicia, reducing the likelihood of improper engagement.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

The present disclosure is illustrated by way of example and not by way of limitation in the figures of the accompanying drawings, in which the like reference numerals indicate like elements and in which.

DETAILED DESCRIPTION

A selected embodiment of the present invention will now be described with reference to the accompanying drawings. It will be apparent to those skilled in the art from this disclosure that the following description of an embodiment of the invention is provided for illustration only and not for the purpose of limiting the invention as defined by the appended claims and their equivalents.

Figure 1:
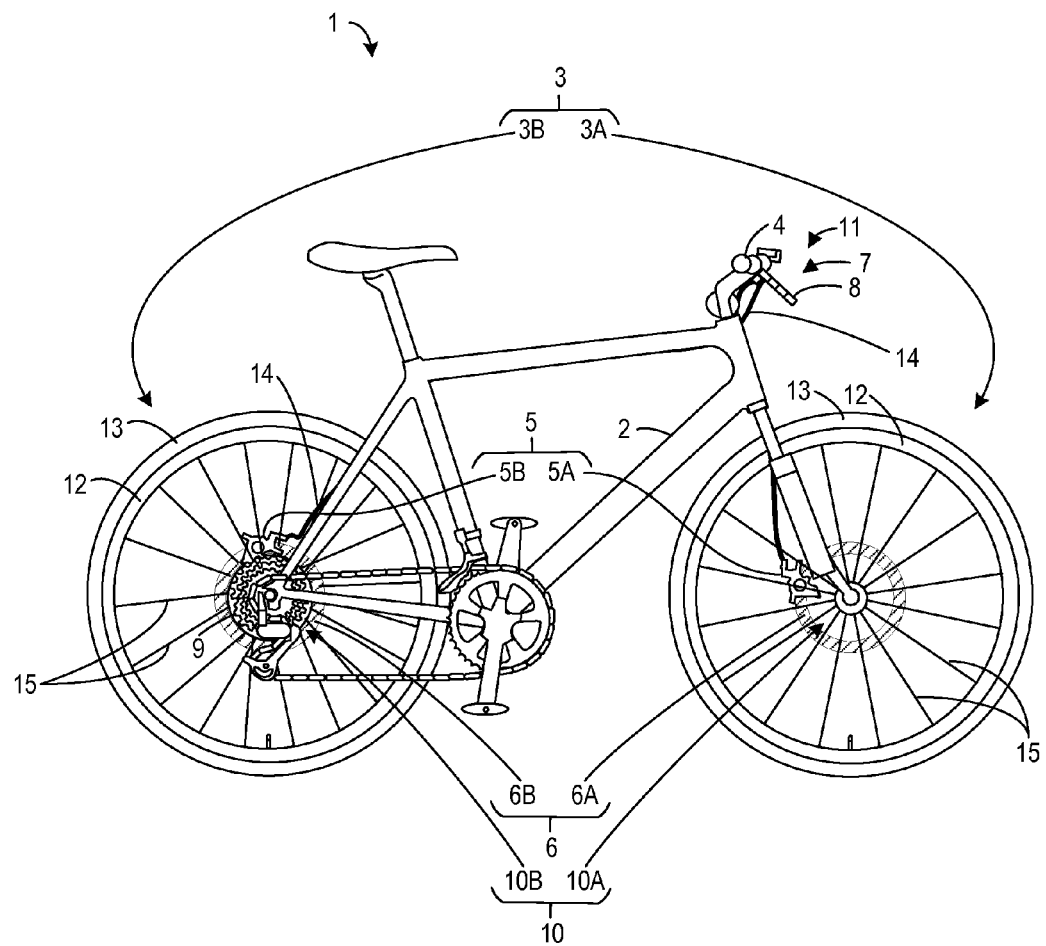
FIG. 1 shows an elevational view of an example bicycle with a hub assembly according to a first embodiment of the present invention.

Referring initially to FIG. 1, a bicycle 1 includes a bicycle frame 2, wheels 3 rotatably coupled to the bicycle frame 2, and a handlebar 4 configured to turn a front wheel 3A. To apply a braking force to the wheels 3, the bicycle 1 also includes a pair of disc brake calipers 5 for gripping corresponding disc rotors 6, according to one example embodiment. In other embodiments, the bicycle 1 may include one or more rim brake mechanisms, or other type of brake mechanisms, in place of the depicted disc brake calipers 5 and disc brake rotors 6. As illustrated, front disc brake caliper 5A is attached to a front fork of the bicycle frame 2 to grip a disc rotor 6A of a front wheel 3A for applying stopping force to the front wheel 3A. Rear disc brake caliper 5B is attached to a chain stay or seat stay of the bicycle frame 2 to grip a disc rotor 6B of a rear wheel 3B for applying stopping force to the rear wheel 3B.

To actuate the disc brake calipers 5, a pair of brake operating devices 7 is provided and coupled to the handlebar 4. Each of the brake operating devices 7 includes a respective lever, which may be referred to as a brake lever 8. The brake operating devices 7, disk brake calipers 5, and disk rotors 6 are included in a braking system 11, in one embodiment. Each of the pair of brake operating devices 7 is connected to the disc brake calipers 5 by control cable 14, respectively. Actuation of the brake operating devices 7 by gripping of the brake lever 8 causes actuation of the disk brake calipers 5 to engage the disk rotors 6, to reduce the rotational velocity of the disk rotors 6. This actuation may be performed via hydraulic operated devices or cable operated devices. The bicycle 1 further includes a rear sprocket assembly 9. In the depicted embodiment the rear sprocket assembly 9 includes a plurality of sprockets. However in other embodiments, the rear sprocket assembly 9 may only include a single sprocket. The rear sprocket assembly 9 may be a cassette, a freewheel, etc. Thus, the rear sprocket assembly 9 may be configured to co-rotate with the wheel 3B in one direction and freely rotate in a second direction opposing the first direction, in one embodiment.

The wheels 3 each include a hub assembly 10. Thus, the bicycle 1 includes a front hub assembly 10A and a rear hub assembly 10B (an example of the hub assembly 10). The front hub assembly 10A and the rear hub assembly 10B preferably include similar components, structural features, characteristics, etc.

Additionally, each of the wheels 3 also includes a rim 12, in the depicted embodiment. However, numerous wheel configurations have been contemplated. Each of the rims 12 can be connected to a portion of the rear hub assembly 10 via spokes 15. Numerous types of spokes 15 have been contemplated such as cylindrical spokes, aero-spokes, etc. Still further in other embodiments one or more disk type wheels may be included in the bicycle 1. Tires 13 are attached to each of the rim 12 of the wheel 3.

Preferably, a portion of the hub assemblies 10 may be removed from the bicycle 1 while the disk rotors 6 and, in the case of the rear hub assembly 10B, the rear sprocket assembly 9 stays coupled (e.g., rotationally coupled) to the bicycle frame 3. This disengagement/engagement feature of the hub assemblies 10 are discussed in greater detail herein.

FIGS. 2-9 show various embodiments of the rear hub assembly 10B. However, it will be appreciated that the rear hub assembly 10B shown in FIGS. 2-9 may also be used as the front hub assembly 10A and therefore is generally referred to as a hub assembly applicable to both a front and rear wheel of a bicycle. Additionally, the rear sprocket assembly 9 may not be attached to hub assembly when the hub assembly is a front hub assembly.

Figure 2:
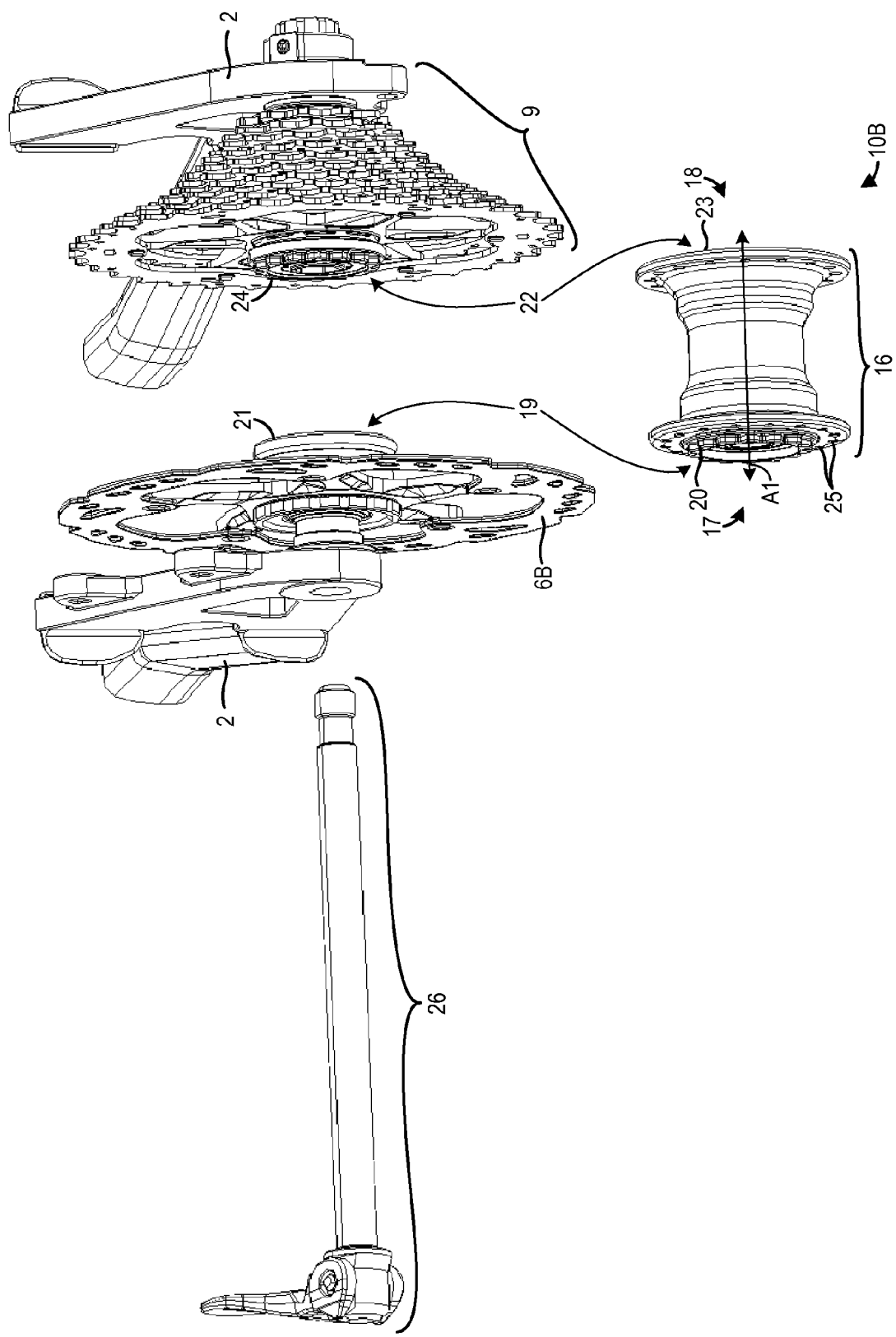
FIG. 2 is a first embodiment of the hub assembly shown in FIG. 1 in a disassembled configuration.

Referring to FIG. 2, the rear hub assembly 10B is illustrated. The rear hub assembly 10B illustrated in FIG. 2 shows a portion of the rear hub assembly disengaged from another portion of the rear hub assembly.

The rear hub assembly 10B includes a hub shell 16. The hub shell 16 includes a first end 17 and a second end 18 positioned at a distance from each other along a rotational axis A1. Thus, the first end 17 is spaced away from the second end 18. It will be appreciated that the rotational axis A1 is the rotational axis of the rear hub assembly 10B and therefore the rear wheel 3B, shown in FIG. 1.

Furthermore, the hub shell 16 may include one or more bearings attached thereto or included therein. Therefore in one example, the hub shell 16 may at least partially enclose one or more bearings. The bearing(s) enable a wheel in which the rear hub assembly may be included to rotate.

The rear hub assembly 10B further includes a first engagement structure pair 19 having a first inner engagement structure 20 and a first outer engagement structure 21. The first inner engagement structure 20 and the first outer engagement structure 21 in the first engagement structure pair 19 are releasably engagable for co-rotation.

The rear hub assembly 10B also includes a second engagement structure pair 22 having a second inner engagement structure 23 and a second outer engagement structure 24. The second inner engagement structure 23 and the second outer engagement structure 24 in the second engagement structure pair 22 are releasably engageable for co-rotation. Preferably, the first inner engagement structure 20 and the first outer engagement structure 21 in the first engagement structure pair 19 may be disengaged from one another and the second inner engagement structure 23 and the second outer engagement structure 24 in the second engagement structure pair 22 may be correspondingly disengaged to enable removal of a portion of the rear hub assembly 10B including the hub shell 16 from another portion of the rear hub assembly 10B, as depicted in the dissembled configuration of the rear hub assembly 10B in FIG. 2.

The hub shell 16 includes spoke openings 25 which may have spokes attached thereto, such as the spokes 15, shown in FIG. 1. Preferably, once the corresponding inner and outer engagement structures (20, 21, 23, and 24) are disengaged from one another, the hub shell 16 and components attached thereto, such as spokes, rims, tires, etc., can be removed for repair, replacement, storage, transportation, etc. Preferably, the engagement structures (20, 21, 23, and 24) allow quick and simplified disengagement of the portion of the rear hub assembly 10B including the hub shell 16 when compared to previous hub assemblies which include one or more sprockets and/or a disk rotor fixedly attached to the hub shell.

Specifically in one embodiment, the first inner engagement structure 20 and the second outer engagement structure 24 may be configured not to engage with each other, and/or the second inner engagement structure 23 and the first outer engagement structure 21 may be configured not to engage with each other. In this way, the likelihood of improper attachment of one portion of the rear hub assembly 10B with another portion of the rear hub assembly 10B is substantially reduced, thereby reducing the likelihood of damage caused by improper engagement of the engagement structures (20, 21, 23, and 24).

In one exemplary embodiment, the first inner engagement structure 20 and the second outer engagement structure 24 may have non-mating shapes that do not engage and/or the second inner engagement structure 23 and the first outer engagement structure 21 have non-mating shapes that do not engage with each other. Various exemplary types of non-mating shapes are discussed in greater detail herein.

The disk rotor 6B is also shown in FIG. 2. The disk rotor 6B is attached to the first outer engagement structure 21. Preferably, the disk rotor 6B and the first outer engagement structure 21 may be configured for co-rotation when the rear hub assembly 10B is rotating. Additionally, the disk rotor 6B and first outer engagement structure 21 may also be rotationally coupled to the bicycle frame 2. Preferably, components, such as bearings, may be provided to facilitate the rotational coupling between the disk rotor 6B and first outer engagement structure 21 and the bicycle frame 2.

The rear sprocket assembly 9 is also illustrated in FIG. 2. The rear sprocket assembly 9 includes a plurality of sprockets, in the depicted embodiment. However in other embodiments, the rear sprocket assembly 9 may include only a single sprocket. The rear sprocket assembly 9 attached to the second outer engagement structure 24 may be configured for co-rotation in a first rotational direction when the rear hub assembly 10B is rotating. However, the rear sprocket assembly 9 may be configured to freely rotate in a second rotational direction opposing the first rotational direction.

Additionally, the rear sprocket assembly 9 and the second outer engagement structure 24 may also be rotationally coupled to the bicycle frame 2. Preferably, components, such as bearings, may be provided to facilitate the rotational coupling between the rear sprocket assembly 9 and second outer engagement structure 24 and the bicycle frame 2.

A wheel securing device 26 is configured to extend through openings in the bicycle frame 2, the disk rotor 6B, the rear hub assembly 10B, and the rear sprocket assembly 9 to enable engagement of a portion of the rear hub assembly 10B including the hub shell 16 and the first and second inner engagement structures 20, 23 to a second portion of the rear hub assembly 10B including the first and second outer engagement structures 21, 24. Preferably, a rider/user can engage and disengage the wheel securing device 26 to enable the aforementioned disengagement and engagement of the inner and outer engagement structures 20, 21, 23, and 24.

Figure 3:
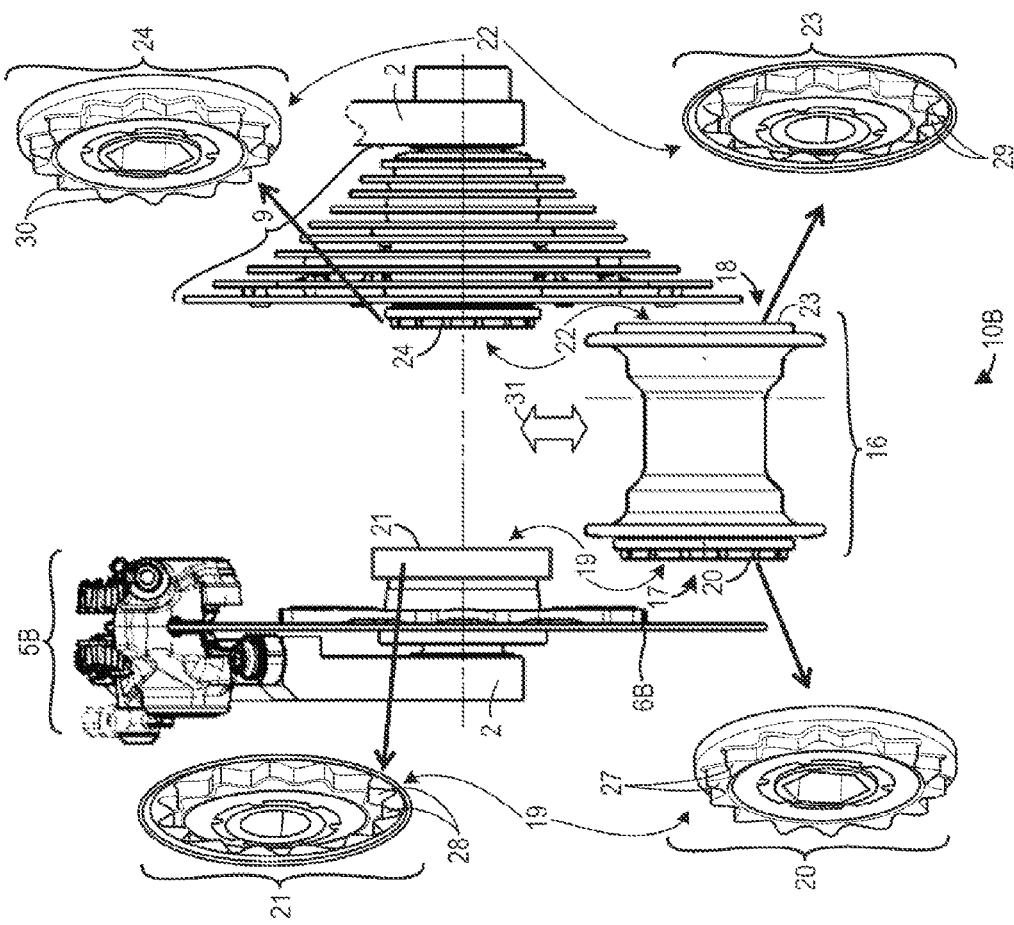
FIG. 3 is another view of the disassembled hub assembly shown in FIG. 2.

FIG. 3 shows an illustration of the rear hub assembly 10B where the first engagement structure pair 19 and the second engagement structure pair 22 are replicated, enlarged, and shown at an angle conducive to highlighting various structural features of the engagement structure pairs 19, 22.

The hub shell 16 with the first end 17 and the second end 18 is depicted in FIG. 3. The disk rotor 6B, the rear sprocket assembly 9, the bicycle frame 2, and disk brake caliper 5B are also shown in FIG. 3.

Detailed views of the first inner engagement structure 20, the first outer engagement structure 21, the second engagement structure pair 22, and the second inner engagement structure 23 are shown in FIG. 3.

Preferably, releasable engagement of each of the first engagement structure pair 19 and the second engagement structure pair 22 may be accomplished by mating of an associated protrusion and a corresponding recess having a complementary shape to the protrusion.

In the depicted embodiment, the first inner engagement structure 20 includes a plurality of protrusions 27 formed thereon. Additionally, the first outer engagement structure 21 includes a plurality of corresponding recesses 28 formed thereon, the recesses 28 having a complimentary shape to the protrusions 27. In other embodiments the first inner engagement structure 20 may include a single protrusion and the first outer engagement structure 21 may include a single recess. Further in other exemplary embodiments the protrusions and recesses may be convexities and concavities. However, numerous shapes, profiles, etc., of the protrusions and recesses have been contemplated.

Additionally, in the depicted embodiment the second inner engagement structure 23 includes a plurality of recesses 29 formed therein. Likewise, the second outer engagement structure 24 includes a plurality of protrusions 30. In other embodiments the second inner engagement structure 23 may include a single recess and the second outer engagement structure 24 may include a single protrusion.

In another embodiment, the first outer engagement structure 21 may include one or more protrusion formed thereon, such as the protrusions 27, and the first inner engagement structure 20 may include one or more complementary recesses formed thereon, such as the recesses 28.

Still further in another embodiment, the second inner engagement structure 23 may include one or more recesses formed thereon, such as the recesses 29, and the second outer engagement structure 24 may include one or more complementary protrusions formed thereon, such as protrusions 30.

As shown, the first inner engagement structure 20 and the second outer engagement structure 24 have a similar size, shape, and profile. Likewise, the first outer engagement structure 21 and the second inner engagement structure 23 have a similar size, shape, and profile. Having the engagement structures 20, 24 and 21, 23 similarly shaped in this way can enable manufacturing costs of the rear hub assembly 10B to be reduced, if desired. However, engagement structures with alternate sizes, shapes, and/or profiles may be used in other embodiments.

Arrows 31 denote the opposing engagement/disengagement directions that the portion of the rear hub assembly 10B including the hub shell 16, the first inner engagement structure 20, and the second inner engagement structure 23 may be moved in to initiate engagement/disengagement of the engagement structures 20, 21, 23, and 24 in the rear hub assembly 10B.

It will be appreciated that the first inner engagement structure 20 and the second outer engagement structure 24 cannot engage with one another, due to the fact that they have substantially identical protrusions 27, 30 which cannot be correspondingly mated.

Likewise, the second inner engagement structure 23 and the first outer engagement structure 21 cannot engage with one another, due to the fact that they have substantially identical recesses 28, 29 which cannot be correspondingly mated. In this way, the likelihood of improper engagement of the engagement structures is substantially reduced.

Figure 4:
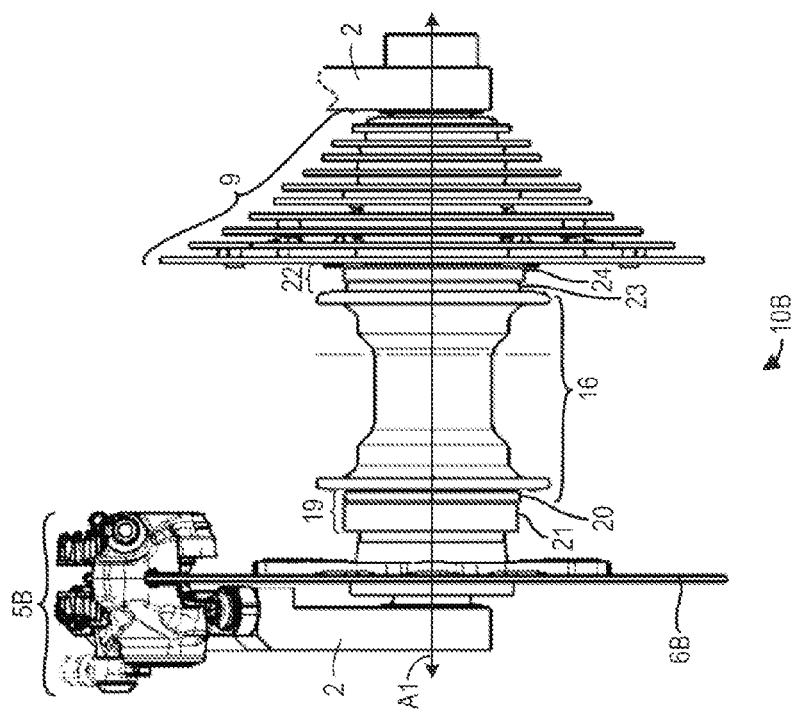
FIG. 4 shows the hub assembly depicted in FIGS. 2 and 3 in an assembled configuration.

FIG. 4 shows an assembled view of the rear hub assembly 10B. Specifically, the first inner engagement structure 20 and the first outer engagement structure 21 in the first engagement structure pair 19 are mated with one another. Specifically, the plurality of protrusions 27 are mated with the plurality of recesses 28, shown in FIG. 3.

Continuing with FIG. 4, the second inner engagement structure 23 and the second outer engagement structure 24 in the second engagement structure pair 22 are mated with one another. In particular, the plurality of protrusions 30 are mated with the plurality of recesses 29, shown in FIG. 3. In this way, the first engagement structure pair 19 and the second engagement structure pair 22 are releasably engaged, as illustrated in FIG. 4. When the first inner engagement structure 20 and the first outer engagement structure 21 are mated they are also positioned coaxially on axis A1. Furthermore, when the second inner engagement structure 23 and the second outer engagement structure 24 are mated they are also positioned coaxially. Additionally, in the mated engagement structure configuration shown FIG. 4 the hub shell 16 is positioned coaxially with the disk rotor 6B and rear sprocket assembly 9 on axis A1. The bicycle frame 2 and disk brake caliper 5B are also shown in FIG. 4.

The mating engagement of the first inner engagement structure 20 and the first outer engagement structure 21 and the second inner engagement structure 23 and the second outer engagement structure 24 enables the hub shell 16, disk rotor 6B, and sprocket set 9 to co-rotate.

In one exemplary embodiment, the first inner engagement structure 20 of the first engagement structure pair 19 and/or the second inner engagement structure 23 of the second engagement structure pair 22 may include at least one recess and one protrusion, and the first outer engagement structure 21 of the first engagement structure pair 19 and/or the second outer engagement structure 24 of the second engagement structure pair 22 may include at least one recess and one protrusion. Specifically in one exemplary embodiment, each of the engagement structure pairs 19, 22 may include only one recess and one protrusion.

Figure 5:
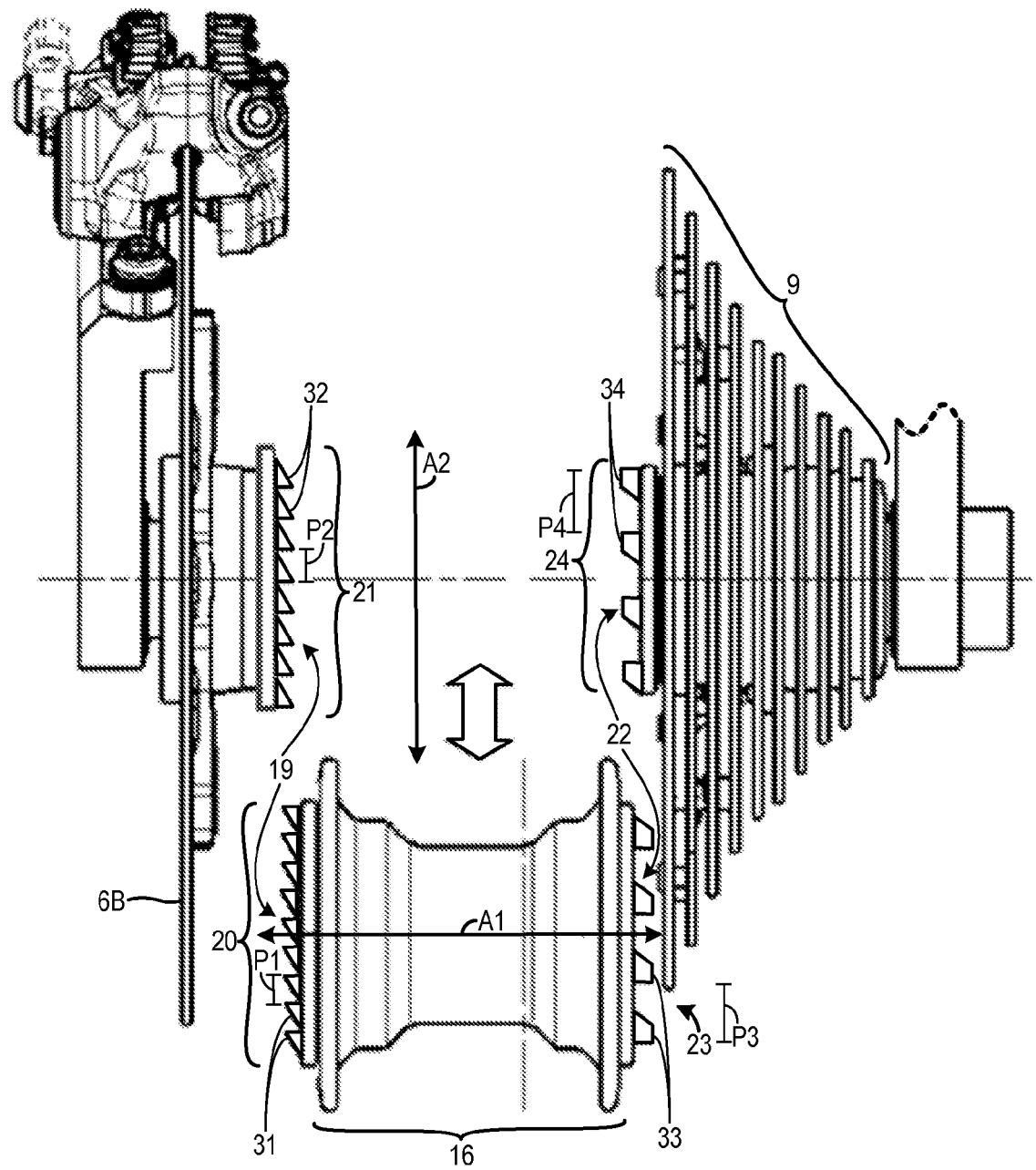
FIG. 5 shows a second embodiment of the hub assembly shown in FIG. 1.

FIG. 5 shows another embodiment of the rear hub assembly 10B. The first engagement structure pair 19 and the second engagement structure pair 22 included in the rear hub assembly 10B are illustrated. The first engagement structure pair 19 includes the first inner engagement structure 20 and the first outer engagement structure 21. Likewise the second engagement structure pair 22 includes the second inner engagement structure 23 and the second outer engagement structure 24.

Each of the engagement structures 20, 21, 23, and 24 include a plurality of protrusions and recesses. These recesses and protrusions are incorporated into teeth formed in the engagement structures, in the embodiment illustrated in FIG. 5. Preferably, these teeth form ridges and valleys. The teeth 31 formed on the first inner engagement structure 20 and the teeth 32 formed on the first outer engagement structure 21, are shown in FIG. 5. Additionally, the teeth 33 formed on the second inner engagement structure 23 and the teeth 34 formed on the second outer engagement structure 24 are depicted in FIG. 5.

Preferably, the teeth 31 and teeth 32 may be correspondingly mated to facilitate engagement with one another. Likewise, teeth 33 and teeth 34 may be correspondingly mated to facilitate engagement with one another. In this way, the engagement structures 20, 21, 23, and 24 can be mated to enable co-rotation of the rear hub shell 16, disk rotor 6B, and rear sprocket assembly 9. As previously discussed, the rear sprocket assembly 9 may only co-rotate with the hub shell 16 and disk rotor 6B in one rotational direction.

As shown, a pitch P1 of the teeth 31 of the first inner engagement structure 20 and a pitch P4 of the teeth 34 of the second outer engagement structure 24 are different and/or a pitch P3 of the teeth 33 of the second inner engagement structure 23 and a pitch P2 of the teeth 32 of the first outer engagement structure 21 are different. The pitches of the teeth 31, 32, 33, and 34 are defined as the distances between the teeth measured along an axis A2. As shown, axis A2 is perpendicular to axis A1.

As shown, a shape characteristic of the protrusions (e.g., teeth 31, 32) in the first engagement structure pair 19 differs from a shape characteristic of the protrusions (e.g., teeth 33, 34) in the second engagement structure pair 22. In the embodiment depicted in FIG. 5 the differing shape characteristics are the number, size, and profile of the teeth 31, 32, 33, and 34. However more broadly the shape characteristic may be selected from a group consisting of an outer perimeter profile, a depth profile, a size, and a pitch, in one embodiment. Further in another exemplary embodiment, a shape characteristic may include one or more geometric characteristics of a component such as a contour, shape, profile, size, etc., of the component.

Figure 6:
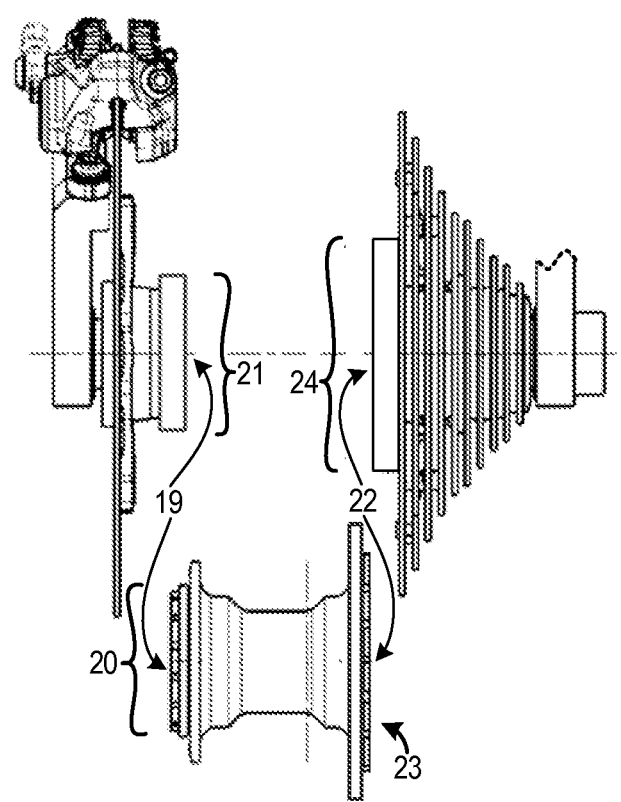
FIG. 6 shows a third embodiment of the hub assembly shown in FIG. 1.

FIG. 6 shows another embodiment of the rear hub assembly 10B. The first engagement structure pair 19 and the second engagement structure pair 22 included in the rear hub assembly 10B are illustrated in FIG. 6. The first engagement structure pair 19 includes the first inner engagement structure 20 and the first outer engagement structure 21. Likewise the second engagement structure pair 22 includes the second inner engagement structure 23 and the second outer engagement structure 24.

As shown in FIG. 6, the first inner engagement structure 20 and the second outer engagement structure 24 differ in size so as to not engage with each other and the second inner engagement structure 23 and the first outer engagement structure 21 differ in size so as to not engage with each other. Specifically in the depicted example the diameters of the first inner engagement structure 20 and the second outer engagement structure 24 varies so as not to engage with one another. Additionally, the diameters of the second inner engagement structure 23 and the first outer engagement structure 21 also vary so as not to engagement with one another. However, other variants in size have been contemplated. For instance, the width between the first inner engagement structure 20 and the second outer engagement structure 24 may vary.

Figure 7:
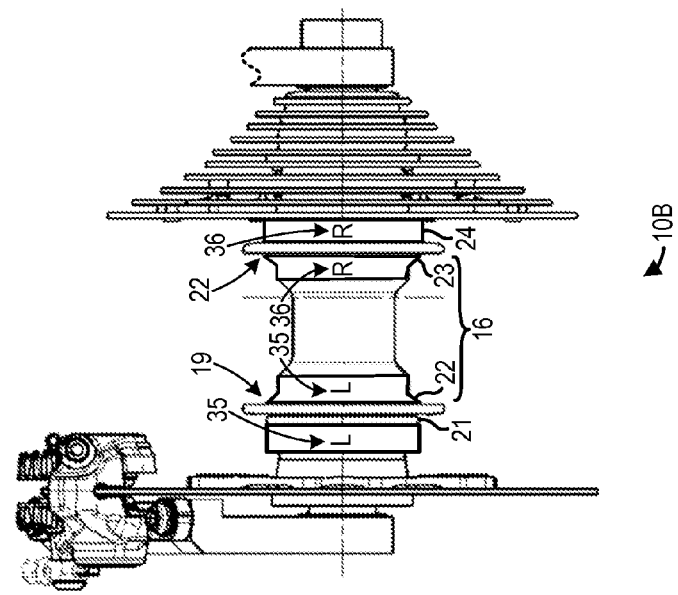
FIG. 7 shows a fourth embodiment of the hub assembly shown in FIG. 1 in a disassembled configuration.

FIG. 7 shows another embodiment of the rear hub assembly 10B. The first engagement structure pair 19 and the second engagement structure pair 22 included in the rear hub assembly 10B are illustrated in FIG. 7. The first engagement structure pair 19 includes the first inner engagement structure 20 and the first outer engagement structure 21. Likewise, the second engagement structure pair 22 includes the second inner engagement structure 23 and the second outer engagement structure 24.

As shown, the first engagement structure pair 19 includes identifying indicia 35 indicating the first engagement structure pair 19. Additionally, the second engagement structure pair 22 includes identifying indicia 36 indicating the second engagement structure pair 22. It will be appreciated that the indicia 35 differ from the indicia 36. Thus, the first engagement structure pair 19 and the second engagement structure pair 22 each include identifying indicia 35, 36 indicating each pair.

As shown in the embodiment depicted in FIG. 7 the indicia 35 and 36 include text to enable differentiation between the first and second engagement structure pairs 19 and 22. However in other exemplary embodiments the indicia 35 and 36 may be selected from a group consisting of pattern, color, picture, and text. Thus, the indicia 35 and 36 may include one or more of a pattern, color, picture, and text.

Additionally, the indicia 35 are included on the first inner engagement structure 20 and the first outer engagement structure 21 and the indicia 36 are included on the second inner engagement structure 23 and the second outer engagement structure 24. However, in other embodiments only the indicia 35 or indicia 36 may be included in the rear hub assembly 10B.

Figure 8:
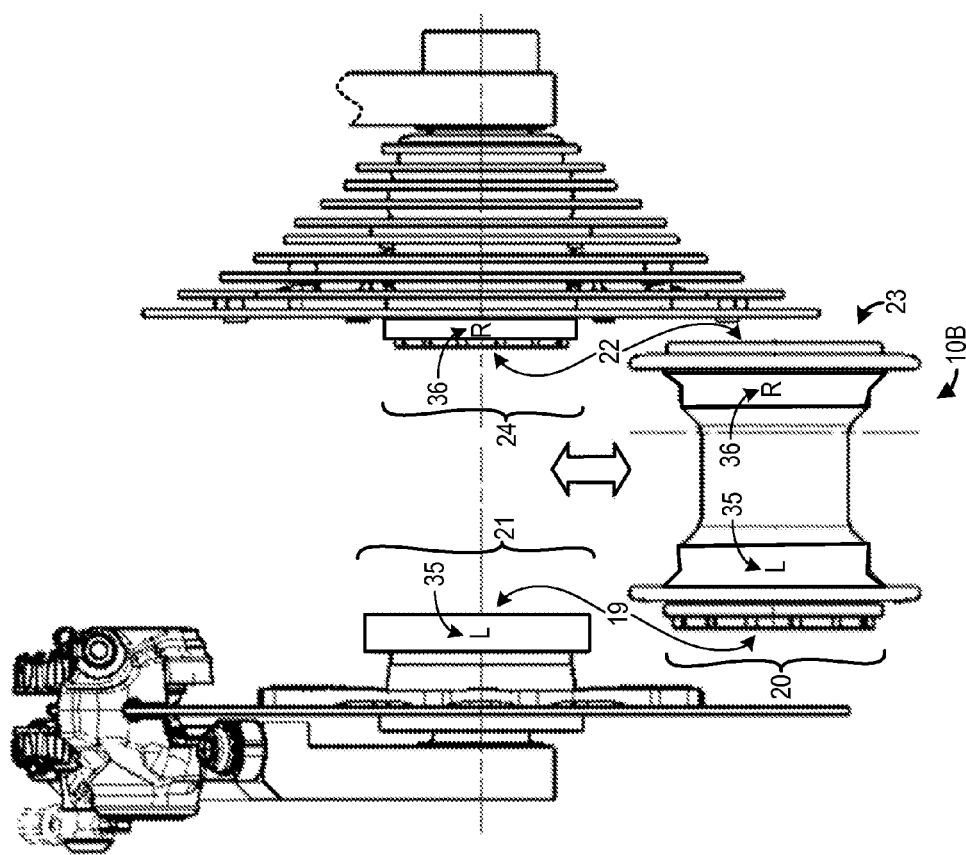
FIG. 8 shows the hub assembly depicted in FIG. 7 in an assembled configuration.

FIG. 8 shows an assembled view of the embodiment of the rear hub assembly 10B, shown in FIG. 7. Therefore, the hub shell 16 and the first inner engagement structure 20 and the second inner engagement structure 23 are in coupling engagement with the first outer engagement structure 21 and the second outer engagement structure 24, respectively. The indicia 35 are matched up to facilitate desired mating engagement between the first inner engagement structure 20 and the first outer engagement structure 21 in the first engagement structure pair 19. Likewise the indicia 36 are matched up to facilitate desired mating engagement between the second inner engagement structure 23 and the second outer engagement structure 24 in the second engagements structure pair 22. Preferably, the indicia 35, 36 enable a rider to easily identify the proper engagement configuration of the engagement structures in the rear hub assembly 10B. As a result, a rider can quickly engage/reengage the engagement structures 20, 21, 23, and 24.

Figure 9:
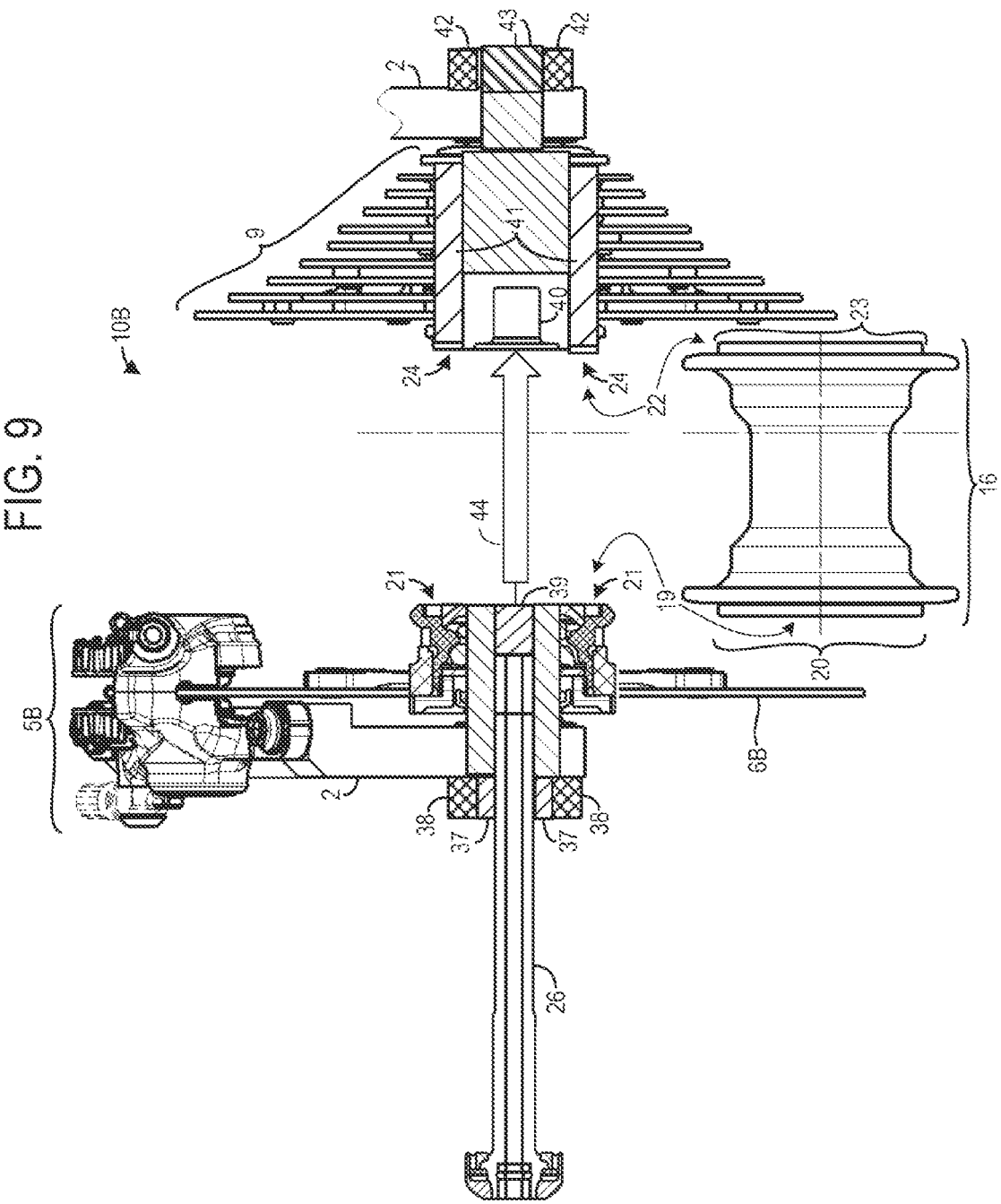
FIG. 9 shows a fifth embodiment of the hub assembly shown in FIG. 1.

FIG. 9 shows another embodiment of the rear hub assembly 10B. The wheel securing device 26 is shown in FIG. 9. When assembled the wheel securing device 26 can be slid through openings in various components in the rear hub assembly 10B to enable secure engagement between the first inner engagement structure 20 and the first outer engagement structure 21 as well as the second inner engagement structure 23 and the second outer engagement structure 24.

The rear hub assembly 10B may further include a first nut 37, a first bolt 38, a second bolt 39, a second nut 40, a rear sprocket assembly support member 41, a third nut 42, and a third bolt 43. The rear sprocket assembly support member 41 is configured to co-rotate with the rear sprocket assembly 9 in a first rotational direction and freely rotate in a second rotational direction opposing the first rotational direction. However, other types of ratcheting mechanisms have been contemplated.

The first nut 37 is coupled to the first bolt 38. Additionally, the third nut 42 is coupled to the third bolt 43, enabling the rear sprocket assembly support member 41 to be coupled to the bicycle frame 2. Specifically, the rear sprocket assembly support member 41 may be rotationally coupled to the bicycle frame 2 when the portion of the rear hub assembly 10B including the hub shell 16, first inner engagement structure 20, and the second inner engagement structure 23 is disengaged. The third nut 42 and third bolt 43 enable the rear sprocket assembly support member 41 to be coupled to the bicycle frame 2 in this way. Likewise, the disk rotor 6B is rotationally coupled to the bicycle frame 2 when the portion of the rear hub assembly 10B including the hub shell 16, first inner engagement structure 20, and the second inner engagement structure 23 is disengaged. The first nut 37 and the first bolt 38 enable the disk rotor 6B to be coupled to the bicycle frame 2 in this way. The disk brake caliper 5B is also coupled to the bicycle frame 2. Attaching the disk rotor 6B and rear sprocket assembly support member 41 to the bicycle frame 2 in this way enables a desired alignment of the disk rotor 6B and rear sprocket assembly 9 to be maintained during removal of the hub shell 16.

The second bolt 39 is included in the wheel securing device 26. When the rear hub assembly 10B is assembled the wheel securing device 26 may be slid through the first bolt 38 and the hub shell 16, and the second engagement structure 24 and attached to the second nut 40 in a direction indicated via arrow 44. Attaching the wheel securing device 26 to the second nut 40 urges the mating engagement structures 20, 21 and 23, 24 towards one another to enable mating engagement. In this way, the portion of the rear hub assembly 10B including the hub shell 16, the first inner engagement structure 20 and the second inner engagement structure 23 can be coupled to a portion of the rear hub assembly 10B including the first outer engagement structure 21 and the second outer engagement structure 24. It will be appreciated that the hub shell 16, disk rotor 6B, and rear sprocket assembly 9 can rotate about the wheel securing device when the engagement structure pairs 19, 22 are mated.

The term "comprising" and its derivatives, as used herein, are intended to be open ended terms that specify the presence of the stated features, elements, components, groups, integers, and/or steps. This concept also applies to words of similar meaning, for example, the terms "have", "include" and their derivatives.

The terms of degree such as "approximately" as used herein mean a reasonable amount of deviation of the modified term such that the end result is not significantly changed (e.g., manufacturing tolerances).

While specific embodiments of the bicycle and hydraulic operating device have been described in detail, the particular arrangements disclosed are meant to be illustrative only and not limiting. The features of the various embodiments described above, as well as modifications thereof, may be variously combined without departing from the scope of this disclosure.

The invention claimed is:

1. A hub assembly for bicycle, comprising:
   a hub shell having first and second ends at a distance from each other along a rotational axis;
   a first engagement structure pair having a first inner engagement structure and a first outer engagement structure, the first engagement structure pair being releasably engagable for co-rotation; and
   a second engagement structure pair having a second inner engagement structure and a second outer engagement structure, the second engagement structure pair being releasably engagable for co-rotation;
   wherein the first inner engagement structure and the second outer engagement structure are configured to be unengagable with each other, and/or the second inner engagement structure and the first outer engagement structure are configured to be unengagable with each other; and
   wherein the first inner engagement structure and the second inner engagement structure are asymmetrically arranged on the hub shell.

2. The hub assembly of claim 1, wherein the first inner engagement structure and the second outer engagement structure have non-mating shapes that are unengagable, and/or the second inner engagement structure and the first outer engagement structure have non-mating shapes that are unengagable with each other.

3. The hub assembly of claim 1, wherein the releasable engagement of the each of the first engagement structure pair and the second engagement structure pair is accomplished by mating of an associated protrusion and a corresponding recess having a complementary shape to the protrusion.

4. The hub assembly of claim 3, wherein the protrusion of the first engagement structure pair is formed on the first inner engagement structure and the recess of the first engagement structure pair is formed on the first outer engagement structure.

5. The hub assembly of claim 3, wherein the protrusion of the first engagement structure pair is formed on the first outer engagement structure and the recess of the first engagement structure pair is formed on the first inner engagement structure.

6. The hub assembly of claim 3, wherein the protrusion of the second engagement structure pair is formed on the second inner engagement structure and the recess of the second engagement structure pair is formed on the second outer engagement structure.

7. The hub assembly of claim 3, wherein the protrusion of the second engagement structure pair is formed on the second outer engagement structure and the recess of the second engagement structure pair is formed on the second inner engagement structure.

8. The hub assembly of claim 3, wherein a shape characteristic of the protrusion of the first engagement structure pair and a shape characteristic of the recess of the second engagement structure pair are different, and/or a shape characteristic of the protrusion of the second engagement structure pair and a shape characteristic of the recess of the first engagement structure pair are different.

9. The hub assembly of claim 8, wherein the shape characteristic is selected from the group consisting of an outer perimeter profile, a depth profile, a size, and a pitch.

10. The hub assembly of claim 3, wherein the protrusion is one of a plurality of protrusions and the recess is one of a plurality of recesses, and wherein the releasable engagement of the each of the first engagement structure pair and the second engagement structure pair is accomplished by mating of the plurality of protrusions and the plurality of recesses.

11. The hub assembly of claim 10, wherein the first inner engagement structure of the first engagement structure pair and/or the second inner engagement structure of the second engagement structure pair includes at least one of the recesses and at least one of the protrusions, and the first outer engagement structure of the first engagement structure pair and/or the second outer engagement structure of the second engagement structure pair includes at least one of the recesses and at least one of the protrusions.

12. The hub assembly of claim 11, wherein the plurality of recesses and the plurality of protrusions are incorporated in teeth formed on the first inner engagement structure and first outer engagement structure and/or the second inner engagement structure and second outer engagement structure.

13. The hub assembly of claim 12, wherein a pitch of the teeth of the first inner engagement structure and a pitch of the teeth of the second outer engagement structure are different and/or a pitch of the teeth of the second inner engagement structure and a pitch of the teeth of the first outer engagement structure are different.

14. The hub assembly of claim 1, wherein the first inner engagement structure and the second outer engagement structure differ in size so as to be unengagable with each other, and/or the second inner engagement structure and the first outer engagement structure differ in size so as to be unengagable with each other.

15. The hub assembly of claim 1, wherein the first engagement structure pair and the second engagement structure pair include identifying indicia indicating each pair.

16. The hub assembly of claim 15, wherein the indicia is selected from a group consisting of pattern, color, picture, and text.

17. The hub assembly of claim 15, wherein the indicia are included on the first inner engagement structure and the first outer engagement structure and/or the second inner engagement structure and the second outer engagement structure.

18. A hub assembly for bicycle, comprising:
a hub shell having first and second ends at a distance from each other along a rotational axis;
a first engagement structure pair having a first inner engagement structure and a first outer engagement structure, the first engagement structure pair being releasably engagable for co-rotation; and
a second engagement structure pair having a second inner engagement structure and a second outer engagement structure, the second engagement structure pair being releasably engagable for co-rotation;
wherein the first inner engagement structure and the second outer engagement structure are configured to be unengagable with each other, and/or the second inner engagement structure and the first outer engagement structure are configured to be unengagable with each other; and
wherein the first inner engagement structure and the second outer engagement structure have non-mating shapes that are unengagable, and/or the second inner engagement structure and the first outer engagement structure have non-mating shapes that are unengagable.

19. A hub assembly for bicycle, comprising:
a hub shell having first and second ends at a distance from each other along a rotational axis;
a first engagement structure pair having a first inner engagement structure and a first outer engagement structure, the first engagement structure pair being releasably engagable for co-rotation; and
a second engagement structure pair having a second inner engagement structure and a second outer engagement structure, the second engagement structure pair being releasably engagable for co-rotation;
wherein the first inner engagement structure and the second outer engagement structure are configured to be unengagable with each other when the first inner engagement structure and the second outer engagement structure are placed in a same side of the hub shell, and/or the second inner engagement structure and the first outer engagement structure are configured to be unengagable with each other when the second inner engagement structure and the first outer engagement structure are placed in a same side of the hub shell.

* * * * *